United States Patent
Fleming

(10) Patent No.: US 6,863,033 B1
(45) Date of Patent: Mar. 8, 2005

(54) NON-SLIP PADS FOR ANIMAL PAWS

(76) Inventor: Marlene M. Fleming, 14615 W. Cleveland Ave., New Berlin, WI (US) 53161

( * ) Notice: Subject to any disclaimer, the term of this patent is extended or adjusted under 35 U.S.C. 154(b) by 8 days.

(21) Appl. No.: 10/729,465

(22) Filed: Dec. 6, 2003

Related U.S. Application Data

(60) Provisional application No. 60/495,420, filed on Aug. 15, 2003.

(51) Int. Cl.[7] ............................ A01K 29/00; A61D 9/00
(52) U.S. Cl. ............................................. 119/850; 36/111
(58) Field of Search .......... 119/850, 851; 36/111; 54/82

(56) References Cited

U.S. PATENT DOCUMENTS

| | | | | |
|---|---|---|---|---|
| 2,443,831 A | * | 6/1948 | Miller | 54/79.1 |
| 3,236,310 A | * | 2/1966 | Quick | 168/18 |
| 3,762,073 A | * | 10/1973 | Cantales | 36/111 |
| 4,444,269 A | * | 4/1984 | Laurent | 168/1 |
| 4,458,431 A | * | 7/1984 | Sinclair | 36/88 |
| 4,967,542 A | * | 11/1990 | MacDonald | 54/82 |
| 5,006,089 A | * | 4/1991 | Lee | 446/267 |
| 5,553,399 A | * | 9/1996 | Strong | 36/9 R |
| 6,186,097 B1 | * | 2/2001 | Brockmann et al. | 119/850 |
| 6,694,713 B1 | * | 2/2004 | MacDonald | 54/82 |

* cited by examiner

*Primary Examiner*—Yvonne R. Abbott
(74) *Attorney, Agent, or Firm*—Donald J. Ersler

(57) ABSTRACT

Non-slip pads for animal paws include a pad with a non-slip surface on one side and a pressure sensitive adhesive on the other side. The pad is fabricated from a material with superior grip characteristics, such as neoprene. The non-slip surface is also preferably textured to increase grip. The pressure sensitive adhesive is preferably a medical adhesive suitable for contact with an animal. A peel-off label is attached to the adhesive to prevent the adhesive from prematurely bonding to another surface. In use, the animal's paw is first cleaned and dried. The peel-off label is removed from the pad and the adhesive side is applied to the cleaned and dried paw.

19 Claims, 1 Drawing Sheet

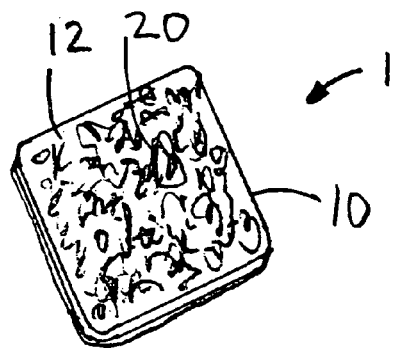
FIG.1
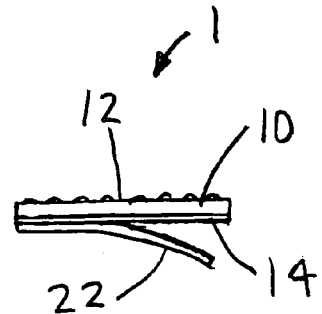
FIG.2
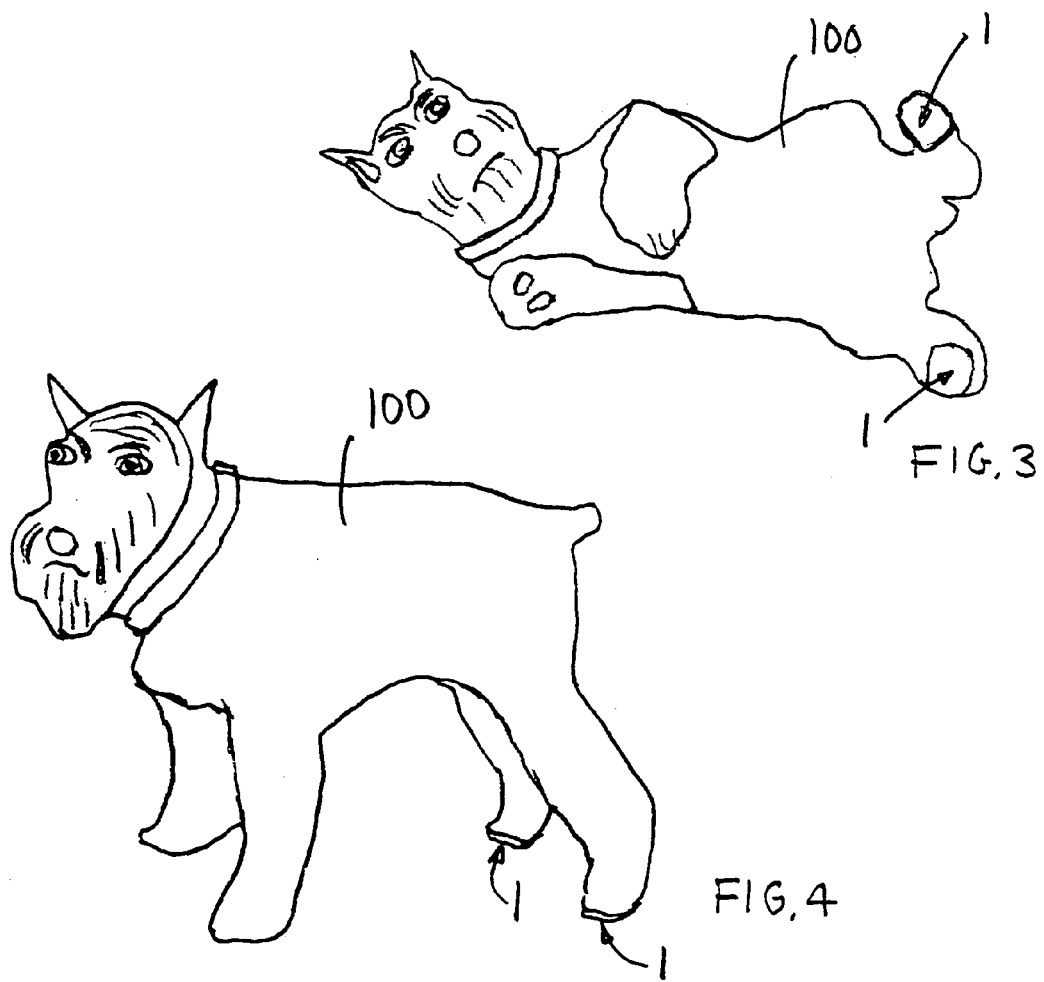
FIG.3
FIG.4

NON-SLIP PADS FOR ANIMAL PAWS

CROSS-REFERENCES TO RELATED APPLICATIONS

This is a utility patent application taking priority from provisional application No. 60/495,420 filed on Aug. 15, 2003.

BACKGROUND OF THE INVENTION

1. Field of the Invention

The present invention relates generally to animals and more specially to non-slip pads for animal paws, which enable the legs of an animal to have traction on slippery surfaces.

2. Discussion of the Prior Art

It appears that the prior art does not disclose applying an object to a paw to provide traction to the legs of an animal on a slippery surface. Further, the paws of an animal should be protected from salt and ice in the winter. Boots may be placed over a bottom of each leg of an animal. However, many animals do not like wearing boots for an extended period of time.

Accordingly, there is a clearly felt need in the art for non-slip pads for animal paws, which are attached to the paws of the animal to provide traction on slippery surfaces, protects the paws from damaging substances, helps animals with physical disabilities and the animal does not mind wearing all the time.

SUMMARY OF THE INVENTION

The present invention provides non-slip pads for animal paws that provide the animal with traction on slippery surfaces. The non-slip pads for animal paws (non-slip pads) include a pad with a non-slip surface on one side and a pressure sensitive adhesive on the other side. The pad is fabricated from a material with superior grip characteristics, such as neoprene. The non-slip surface is also preferably textured to increase grip. The pressure sensitive adhesive is preferably a medical adhesive suitable for contact with a paw of an animal. A peel-off label is preferably attached to the adhesive to prevent thereof from prematurely bonding to another surface. In use, the animal's paw is first cleaned and dried. The peel-off label is removed from the pad and the adhesive side is applied to the cleaned and dried paw.

Accordingly, it is an object of the present invention to provide non-slip pads, which may be attached to paws to provide traction to the legs of an animal on slippery surfaces.

It is another object of the present invention to provide non-slip pads, which protect the paws of animal from damaging substances.

It is yet another object of the present invention to provide non-slip pads, which helps animals with hip, back or leg disabilities get grip, when rising or walking.

Finally, it is another object of the present invention to provide non-slip pads, which an animal does not mind wearing all the time.

These and additional objects, advantages, features and benefits of the present invention will become apparent from the following specification.

BRIEF DESCRIPTION OF THE DRAWINGS

FIG. 1 is a perspective view of a non-slip pad in accordance with the present invention.

FIG. 2 is an end view of a non-slip pad in accordance with the present invention.

FIG. 3 is a front perspective view of two non-slip pads attached to the paws of an animal in accordance with the present invention.

FIG. 4 is a side perspective view of two non-slip pads attached to the paws of an animal in accordance with the present invention.

DETAILED DESCRIPTION OF THE PREFERRED EMBODIMENTS

With reference now to the drawings, and particularly to FIG. 1, there is shown a perspective view of a non-slip pad 1. With reference to FIG. 2, the non-slip pad 1 includes a pad 10 with a non-slip surface 12 on one side and a pressure sensitive adhesive 14 applied to the other side thereof. The pad 10 is fabricated from a material with superior grip characteristics, such as neoprene. The non-slip surface 12 is preferably textured 20 to increase grip. The figures disclose the pad 10 as having a substantially rectangular shape. However, the shape of the pad should not be limited to that shown, but should include any appropriate shape, such as round.

The pressure sensitive adhesive 14 is preferably a medical adhesive suitable for contact with an animal 100. A peel-off label 22 is preferably attached to the adhesive 14 to prevent thereof from prematurely bonding to another surface. However, other suitable items may be used instead of the peel-off label 22. In use, the paws of an animal 100 are first cleaned, then dried. The peel-off label 22 is removed from the pad 10 and the adhesive side of the pad 10 is firmly applied to the paw.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of providing traction to at least one paw of an animal, comprising the steps of:
    providing a pad having a non-slip surface on one side;
    applying a pressure sensitive adhesive to the other side of said pad, said pressure sensitive adhesive not causing harm to the animal; and
    attaching a pressure sensitive adhesive side of said pad to a paw of an animal.

2. The method of providing traction to at least one paw of an animal of claim 1, further comprising the step of:
    applying a peel-off label to said pressure sensitive adhesive to prevent premature bonding to another surface.

3. The method of providing traction to at least one paw of an animal of claim 1, further comprising the step of:
    cleaning and drying the paw of the animal before attaching said pad.

4. The method of providing traction to the at least one paw of an animal of claim 1, further comprising the step of:
    texturing the one side of said pad to improve traction thereof.

5. The method of providing traction to at least one paw of an animal of claim 1, further comprising the step of:
    fabricating said pad from neoprene.

6. The method of providing traction to at least one paw of an animal of claim 1, further comprising the step of:
    forming said pressure sensitive adhesive from a medical adhesive.

7. A non-slip pad for an animal paw, comprising:

a pad having a non-slip surface on one side;

a pressure sensitive adhesive is applied to the other side of said pad, said pressure sensitive adhesive not causing harm to the animal, wherein attaching a pressure sensitive adhesive side of said pad to a paw of an animal; and a peel-off label is applied to said pressure sensitive adhesive.

8. The non-slip pad for an animal paw of claim 7, comprising:

the one side of said pad having texturing to improve traction thereof.

9. The non-slip pad for an animal paw of claim 7, comprising:

said pad is fabricated from neoprene.

10. A method of providing traction to at least one paw of an animal, comprising the steps of:

providing a pad having a non-slip surface on one side;

applying a pressure sensitive adhesive to the other side of said pad, said pressure sensitive adhesive not causing harm to the animal;

applying means to prevent premature adhesion of said pressure sensitive adhesive; and removing said means to prevent premature adhesion, attaching a pressure sensitive adhesive side of said pad to a paw of the animal.

11. The method of providing traction to at least one paw of an animal of claim 10, further comprising the step of:

providing a peel-off label for said means to prevent premature adhesion.

12. The method of providing traction to at least one paw of an animal of claim 10, further comprising the step of:

cleaning and drying the paw of the animal before attaching said pad.

13. The method of providing traction to the at least one paw of an animal of claim 10, further comprising the step of:

texturing the one side of said pad to improve traction thereof.

14. The method of providing traction to at least one paw of an animal of claim 10, further comprising the step of:

fabricating said pad from neoprene.

15. The method of providing traction to at least one paw of an animal of claim 10, further comprising the step of:

forming said pressure sensitive adhesive from a medical adhesive.

16. A non-slip pad for an animal paw, comprising:

a pad having a non-slip surface on one side; and a pressure sensitive adhesive is applied to the other side of said pad, said pressure sensitive adhesive is a medical adhesive, said pressure sensitive adhesive not causing harm to the animal, wherein attaching a pressure sensitive adhesive side of said pad to a paw of an animal.

17. The non-slip pad for an animal paw of claim 16, comprising:

a peel-off label is applied to said pressure sensitive adhesive.

18. The non-slip pad for an animal paw of claim 16, comprising:

the one side of said pad having texturing to improve traction thereof.

19. The non-slip pad for an animal paw of claim 16, comprising:

said pad is fabricated from neoprene.

* * * * *